(12) United States Patent
Taguchi et al.

(10) Patent No.: US 9,318,924 B2
(45) Date of Patent: Apr. 19, 2016

(54) ROTOR MECHANISM OF ROTATING ELECTRICAL MACHINE AND METHOD OF MANUFACTURING SAME

(75) Inventors: Naoto Taguchi, Matsudo (JP); Tsukasa Morita, Ebina (JP); Hiroshi Miyaoka, Tokyo (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 415 days.

(21) Appl. No.: 14/002,012

(22) PCT Filed: Mar. 1, 2012

(86) PCT No.: PCT/JP2012/055267
§ 371 (c)(1),
(2), (4) Date: Aug. 28, 2013

(87) PCT Pub. No.: WO2012/118157
PCT Pub. Date: Sep. 7, 2012

(65) Prior Publication Data
US 2013/0334926 A1    Dec. 19, 2013

(30) Foreign Application Priority Data

Mar. 2, 2011  (JP) .................. 2011-045287
Feb. 29, 2012  (JP) .................. 2012-043774

(51) Int. Cl.
*H02K 1/06* (2006.01)
*H02K 1/28* (2006.01)
*H02K 15/02* (2006.01)

(52) U.S. Cl.
CPC ................. *H02K 1/28* (2013.01); *H02K 15/02* (2013.01); *Y10T 29/49012* (2015.01)

(58) Field of Classification Search
CPC ..... H02K 1/28; H02K 15/02; Y10T 29/49012
USPC ...................... 310/156.22, 216.114, 216.116, 310/216.121, 216.131, 216.134; 29/596, 29/598
See application file for complete search history.

(56) References Cited

U.S. PATENT DOCUMENTS

| 7,743,484 B2 | 6/2010 | Fukumaru et al. |
| 7,768,168 B2 * | 8/2010 | Aschoff ............... H02K 1/2733 310/156.08 |

(Continued)

FOREIGN PATENT DOCUMENTS

| CN | 1103998 A | 6/1995 |
| CN | 101296776 A | 10/2008 |

(Continued)

OTHER PUBLICATIONS

Japanese Office Action, Feb. 3, 2015, 3 pages.

(Continued)

*Primary Examiner* — Thanh Lam
(74) *Attorney, Agent, or Firm* — Foley & Lardner LLP

(57) ABSTRACT

In a rotor mechanism of a rotating electrical machine, a crimp groove is formed, in a circumferential direction, in an outer circumferential portion of any one of the end plates of a rotor shaft on an outside in the axial direction. The one end plate is located in the axial direction by an inside end of a crimp retainer in the axial direction that is ring-shaped, that covers the crimp groove of the rotor shaft to fit to the rotor shaft, that is fitted into the crimp groove of the rotor shaft by crimping an outside portion in the axial direction from an outer circumferential side and that engages with a wall surface of the crimp groove on the outside in the axial direction.

7 Claims, 11 Drawing Sheets

(56) References Cited

U.S. PATENT DOCUMENTS

| | | | | |
|---|---|---|---|---|
| 8,970,085 | B2 * | 3/2015 | Takahashi | H02K 1/276 310/216.114 |
| 2007/0103023 | A1 * | 5/2007 | Tapper | H02K 1/2773 310/156.19 |
| 2009/0056103 | A1 | 3/2009 | Fukumaru et al. | |
| 2009/0284093 | A1 * | 11/2009 | Shiao | H02K 1/278 310/156.22 |
| 2011/0037340 | A1 * | 2/2011 | Tou | H02K 7/003 310/216.116 |
| 2013/0193811 | A1 * | 8/2013 | Chamberlin | H02K 17/165 310/60 R |

FOREIGN PATENT DOCUMENTS

| | | |
|---|---|---|
| JP | 07-212912 A | 8/1995 |
| JP | 2006-067668 A | 3/2006 |
| JP | 2006-187063 A | 7/2006 |
| JP | 2007-124752 A | 5/2007 |
| JP | 2008-193772 A | 8/2008 |
| JP | 2010-148250 A | 7/2010 |

OTHER PUBLICATIONS

Chinese Office Action, Jan. 26, 2015, 7 pages.

* cited by examiner

ROTOR MECHANISM OF ROTATING ELECTRICAL MACHINE AND METHOD OF MANUFACTURING SAME

TECHNICAL FIELD

The present invention relates to a rotor mechanism that functions as a rotor or an armature of a rotating electrical machine such as an electrical motor and a method of manufacturing such a rotor mechanism, and more particularly relates to a rotor mechanism of a rotating electrical machine suitable for fastening a core and a shaft and a method of manufacturing such a rotor mechanism.

BACKGROUND ART

JP2006-187063A discloses, as a fastening mechanism of a core and a shaft in which a large number of electromagnetic steel sheets constituting a rotor of a rotating electrical machine are stacked in layers, a fastening mechanism in which end plates arranged on both side surfaces of the core are directly pressed into the shaft and fixed thereto.

This is achieved by a mechanism in which a collar is interposed between the core and the shaft that are constituent elements of the rotor and in which the shaft and the collar, and the collar and core are pressed and fastened with a predetermined clearance. On both side surfaces of the core, the end plates directly pressed into the shaft are arranged. When the core and the end plates are formed with a silicon steel sheet and the shaft is formed with a steel rod, the collar is formed of a non-ferrous metal material such as a magnesium alloy that has a higher linear expansion coefficient than at least the core and the shaft. Thus, even if the individual elements are thermally expanded under a high temperature environment, a clearance of the collar with respect to the shaft in a direction in which a diameter is reduced is acquired.

SUMMARY OF THE INVENTION

However, in the conventional example described above, the end plates arranged on both sides of the core are directly pressed and fixed into the shaft. Hence, disadvantageously, in a case where the outside diameter of the shaft is large, variations in the inside diameter of the end plates and in the outside diameter of the shaft produced when the end plates are pressed into the shaft easily cause variations in press-in force (the force holding the end plates), and they come off depending on the situation.

The present invention is made in view of the conventional problem described above. An object of the present invention is to provide a rotor mechanism of a rotating electrical machine suitable for fastening a core and a shaft and a method of manufacturing such a rotor mechanism.

According to one aspect of the present invention, there is provided a rotor mechanism of a rotating electrical machine that supports and includes a core obtained by stacking a plurality of disc-shaped magnetic steel plates on an outer circumference of a rotor shaft and disc-shaped end plates arranged on both sides of the core in an axial direction.

In the present invention, in the rotor shaft, a crimp groove is formed, in a circumferential direction, in an outer circumferential portion of any one of the end plates on an outside in the axial direction. The one end plate is located in the axial direction by an inside end of a crimp retainer in the axial direction that is ring-shaped, that covers the crimp groove of the rotor shaft to fit to the rotor shaft, that is fitted into the crimp groove of the rotor shaft by crimping an outside portion in the axial direction from an outer circumferential side and that engages with a wall surface of the crimp groove on the outside in the axial direction.

Embodiments of the present invention and advantages of the present invention will be described in detail below with reference to accompanying drawings.

DESCRIPTION OF THE EMBODIMENTS

First Embodiment

Figure 1:
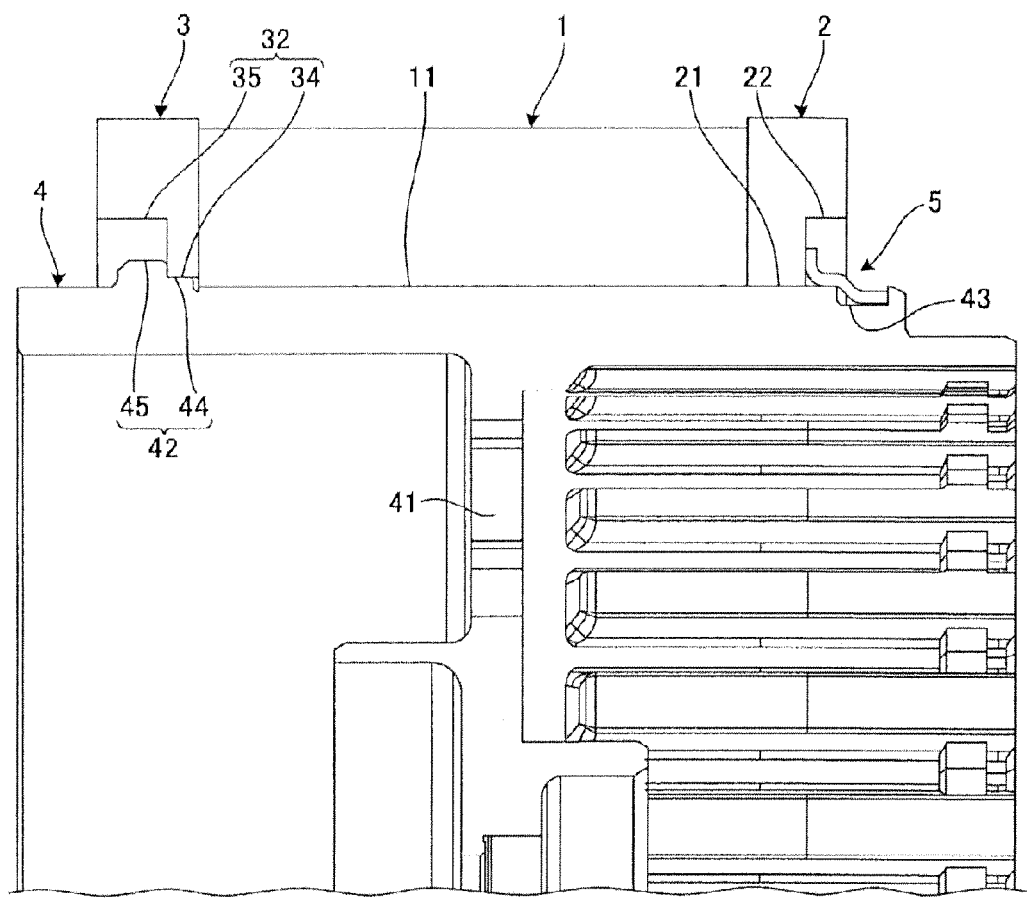
FIG. 1 is a schematic configuration diagram of a rotor mechanism of a rotating electrical machine showing an embodiment of the present invention.

FIG. 1 is a cross-sectional view showing an embodiment of a rotor mechanism of a rotating electrical machine according to the present invention. In FIG. 1, the rotor mechanism of the rotating electrical machine includes a cylindrical core 1, disc-shaped end plates 2 and 3 arranged on both sides of the core 1, a rotor shaft 4 that inserts through and supports the core 1 and the end plates 2 and 3, and a crimp retainer 5 that locates and fixes the core 1 and the end plates 2 and 3 on the rotor shaft 4.

The rotor shaft 4 is cylindrical, includes, in an inner circumferential portion of a cylindrical portion, a flange 41 extending in an inner circumferential direction, is fastened through the flange 41 to an unillustrated drive shaft and is formed rotatably together with the drive shaft. The outside diameter of the rotor shaft 4 is formed to be substantially equal to the inside diameter of the core 1. In an outer circumferential portion of a region of the rotor shaft 4 supporting the core 1 on one side in the axial direction, a protrusion portion 42 that supports the end plate 3 on the other side is formed around the entire circumference. In the outer circumferential portion of the region of the rotor shaft 4 supporting the core 1 on the other side in the axial direction, a crimp groove 43 engaging with the crimp retainer 5 is formed around the entire circumference. The crimp groove 43 may not be provided on the entire circumference, and may be provided partially in the circumferential direction. In the example shown in the figure, the outer circumferential portion of the rotor shaft 4 has a smaller diameter outwardly of a portion (away from the support region of the core 1) where the crimp groove 43 is arranged.

The protrusion portion 42 is formed in a stepped shape with a small-diameter portion 44 and a large-diameter portion 45. The small-diameter portion 44 is adjacent to the region supporting the core 1 and protrudes from the outer circumferential portion of the rotor shaft 4 to the outer circumference in the radial direction, the large-diameter portion 45 is formed to protrude, in an outside connecting (away from the support region of the core 1) to the small-diameter portion 44 in the axial direction, from the outer circumferential portion of the rotor shaft 4 to the outer circumference in the radial direction.

The core 1 is formed such that, for example, a shaft insertion hole 11 is formed in the center portion of a circular magnetic steel plate made of magnetic material, and that a plurality of magnetic steel plates are integrally stacked in layers by crimp processing or the like.

Figure 2:
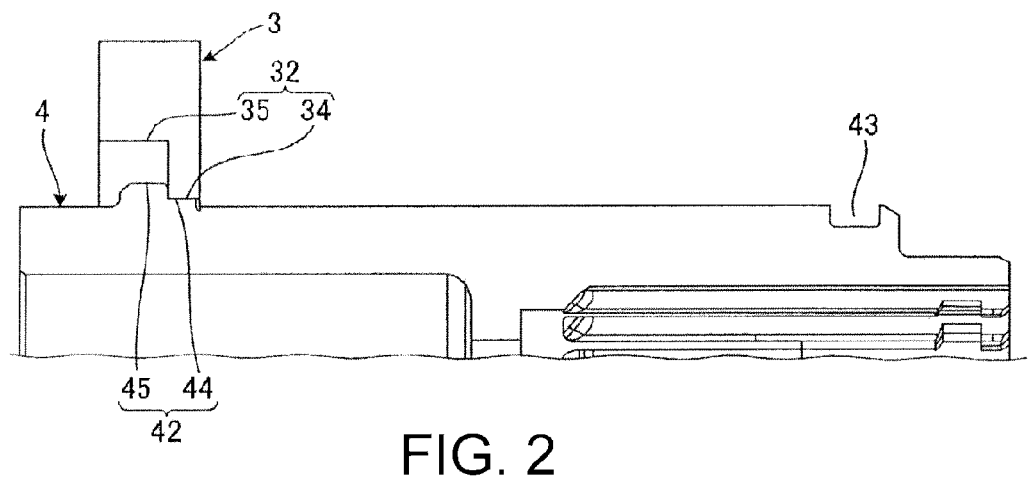
FIG. 2 is an illustrative diagram showing a step of manufacturing the rotor mechanism of the rotating electrical machine.

In an inner-diameter portion of the disc-shaped end plate 3 on the other side, a stepped hole 32 composed of a small-diameter hole 34 fitting to the small-diameter portion 44 of the protrusion portion 42 and a large-diameter hole 35 facing the large-diameter portion 45 of the protrusion portion 42 is formed. As shown in FIG. 2, in the end plate 3 on the other side, the small-diameter hole 34 of the stepped hole 32 is fitted to the small-diameter portion 44 of the stepped protrusion 42 of the rotor shaft 4, and a stepped portion between the small-diameter hole 34 and the large-diameter hole 35 makes contact with a stepped portion between the large-diameter portion 45 and the small-diameter portion 44 of the stepped protrusion in the axial direction, and thus are supported by the protrusion portion 42 of the rotor shaft 4.

Figure 3:
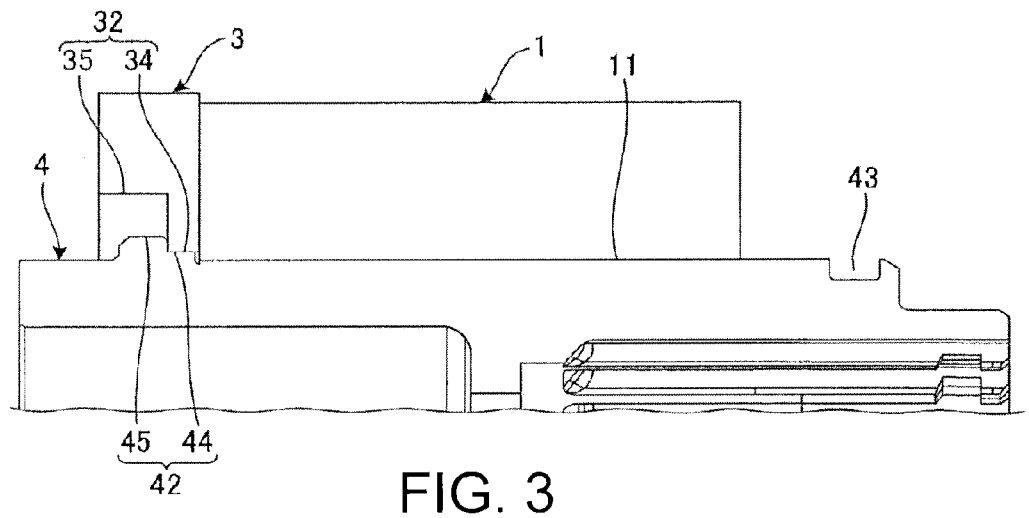
FIG. 3 is an illustrative diagram showing a step of manufacturing the rotor mechanism of the rotating electrical machine, subsequent to FIG. 2.

As also shown in FIG. 3, in the end plate 3 on the other side, the core 1 formed with the disc-shaped stacked steel plates is fitted to the outer circumferential portion of the rotor shaft 4, and they are stacked in the axial direction.

Figure 4:
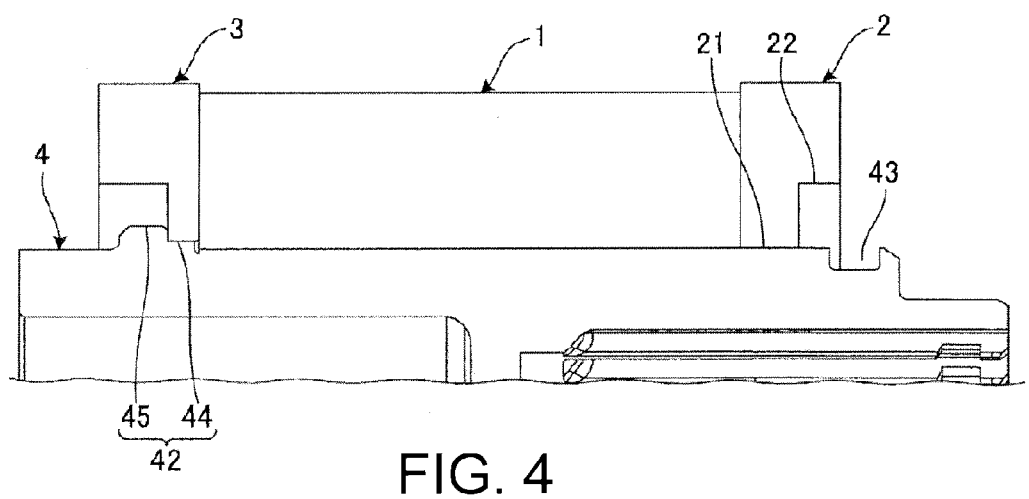
FIG. 4 is an illustrative diagram showing a step of manufacturing the rotor mechanism of the rotating electrical machine, subsequent to FIG. 3.

In an inside-diameter portion of the disc-shaped end plate 2 on the one side, a stepped hole composed of a small-diameter hole 21 arranged on a side in contact with the core 1 and a large-diameter hole 22 arranged on the side opposite to the side of the core 1 is formed. As also shown in FIG. 4, the end plate 2 on the one side has the small-diameter hole 21 of the stepped hole fitted to the outer circumferential portion of the rotor shaft 4, is stacked from the other side of the core 1 in the axial direction and is supported by the rotor shaft 4.

Figure 8:
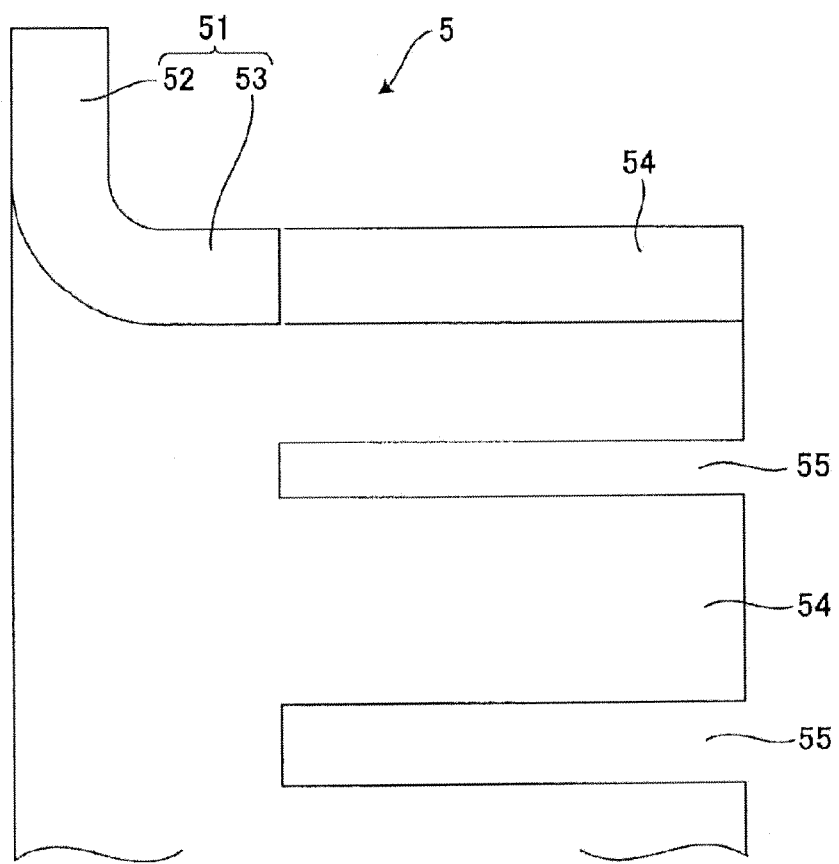
FIG. 8 is a partial cross-sectional view of a crimp retainer used.

As shown in FIG. 8, the crimp retainer 5 is formed with a ring-shaped portion 51 which is formed with a ring-shaped flange portion 52 and a ring-shaped sleeve portion 53, whose cross section is formed in the shape of an L and which is formed in the shape of a disc and a crimp part 54 which protrudes from the sleeve portion 53 in the axial direction and is deformed by crimping. The sleeve portion 53 and the crimp part 54 are formed to fit to the outer circumference of the rotor shaft 4, and the sleeve portion 53 is fitted to the rotor shaft 4 and thus is located in the radial direction with respect to the rotor shaft 4.

In the ring-shaped portion 51 of the crimp retainer 5, its cross section is formed in the shape of an L with the flange portion 52 and the sleeve portion 53 such that shape rigidity, that is, bending rigidity with respect to a flat surface perpendicular to the shaft is acquired by the sleeve portion 53 and circular rigidity is acquired by the flange portion 52.

Figure 5:
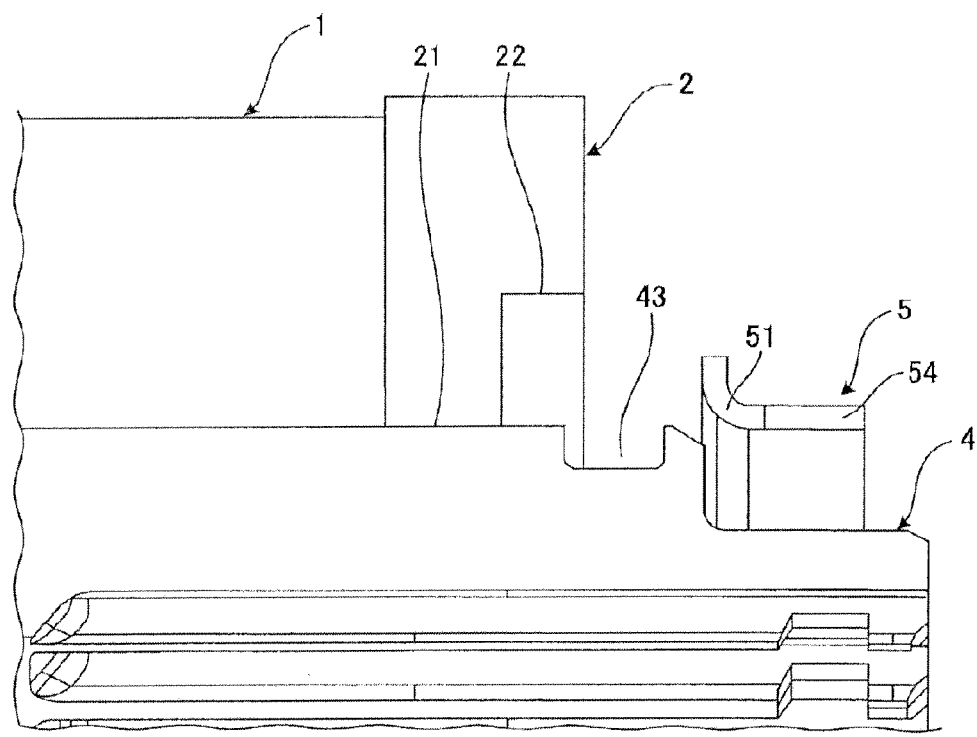
FIG. 5 is an illustrative diagram showing a step of manufacturing the rotor mechanism of the rotating electrical machine, subsequent to FIG. 4.
Figure 6:
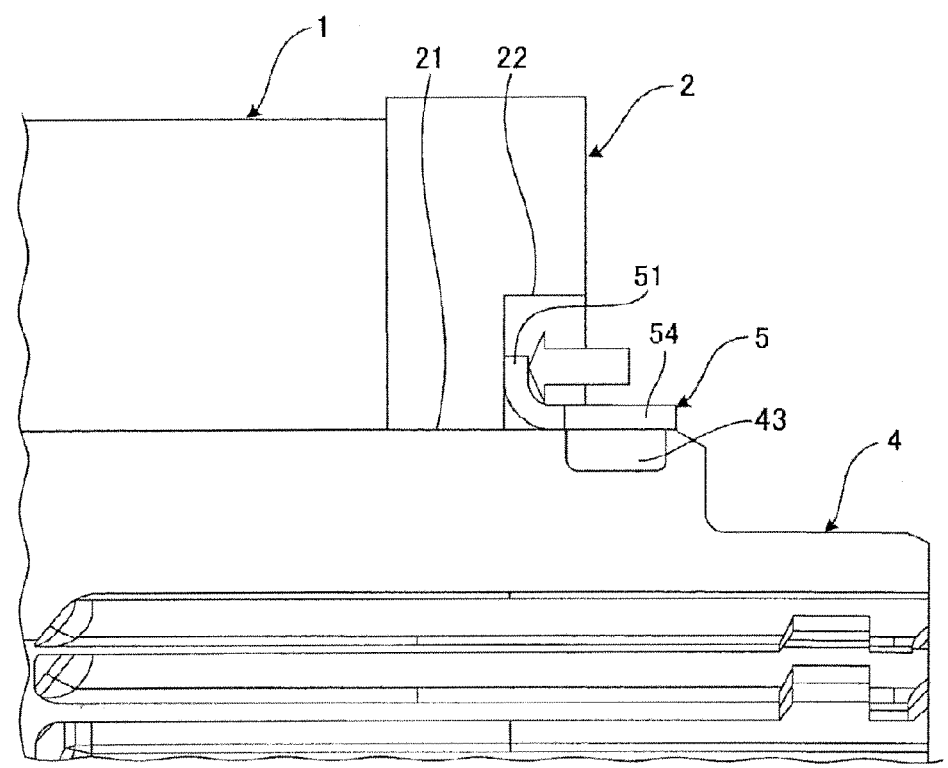
FIG. 6 is an illustrative diagram showing a step of manufacturing the rotor mechanism of the rotating electrical machine, subsequent to FIG. 5.

As shown in FIG. 5, the crimp retainer 5 is fitted from the side of the crimp groove 43 to the rotor shaft 4, and is, as shown in FIG. 6, brought into contact with the stepped portion between the small-diameter hole 21 and the large-diameter hole 22 of the end plate 2 on the one side of the flange portion 52. Then, a pressure is applied from the side of the crimp retainer 5 in the axial direction such that a constant pre-pressure (pre-load) is applied to the end plate 3, the core 1 and the end plate 2 arranged between the crimp retainer 5 and the protrusion portion 42 of the rotor shaft 4.

Figure 7:
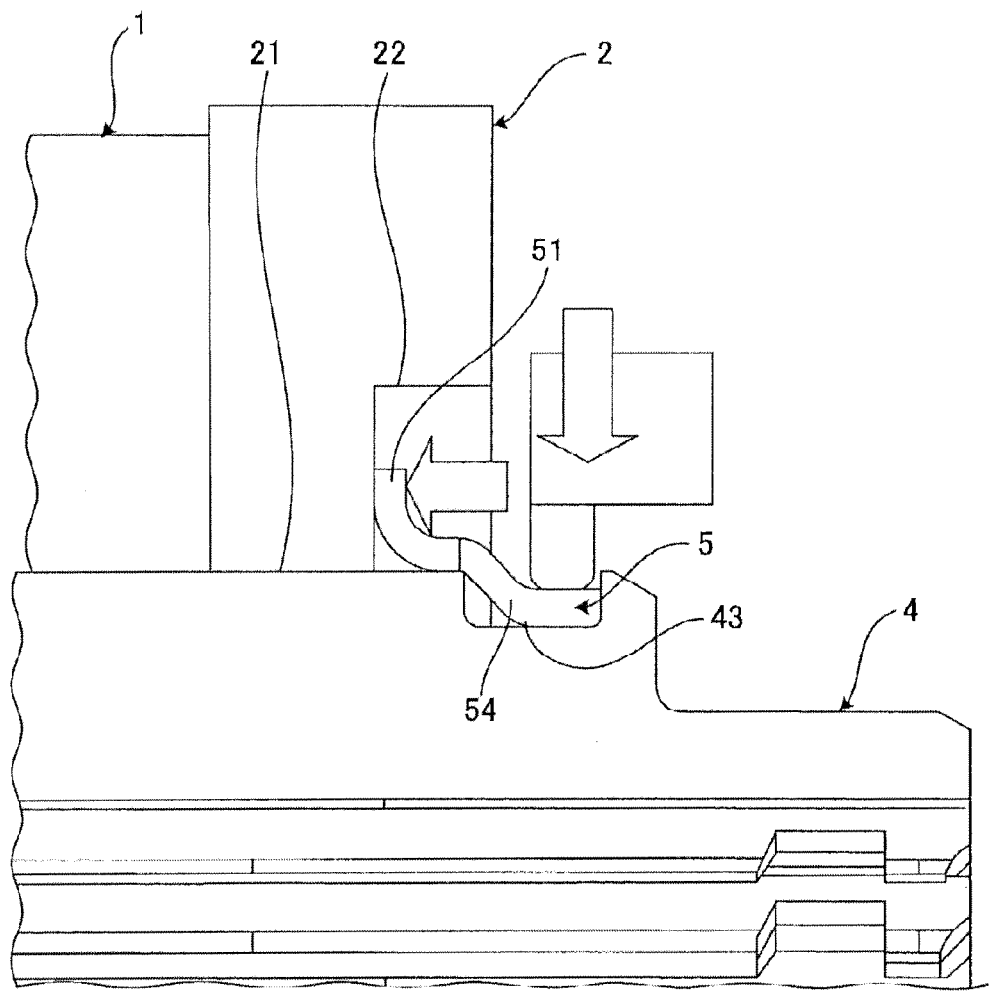
FIG. 7 is an illustrative diagram showing a step of manufacturing the rotor mechanism of the rotating electrical machine, subsequent to FIG. 6.

Thereafter, as shown in FIG. 7, the crimp part 54 of the crimp retainer 5 is bent by crimp processing from the outer circumference into the crimp groove 43 inwardly in the radial direction, thus is fitted into the crimp groove 43 and is located with respect to the rotor shaft 4 in the axial direction. Then, in the crimp retainer 5, the bending end of the crimp part 54 is pressed onto the wall surface of the bottom portion of the crimp groove 43, is prevented from being moved outwardly in the axial direction and is strutted, and thus it is possible to locate and fix the crimp retainer 5 on the rotor shaft 4 with the pre-pressure kept applied to both the end plates 2 and 3 and the core 1.

Figure 9:
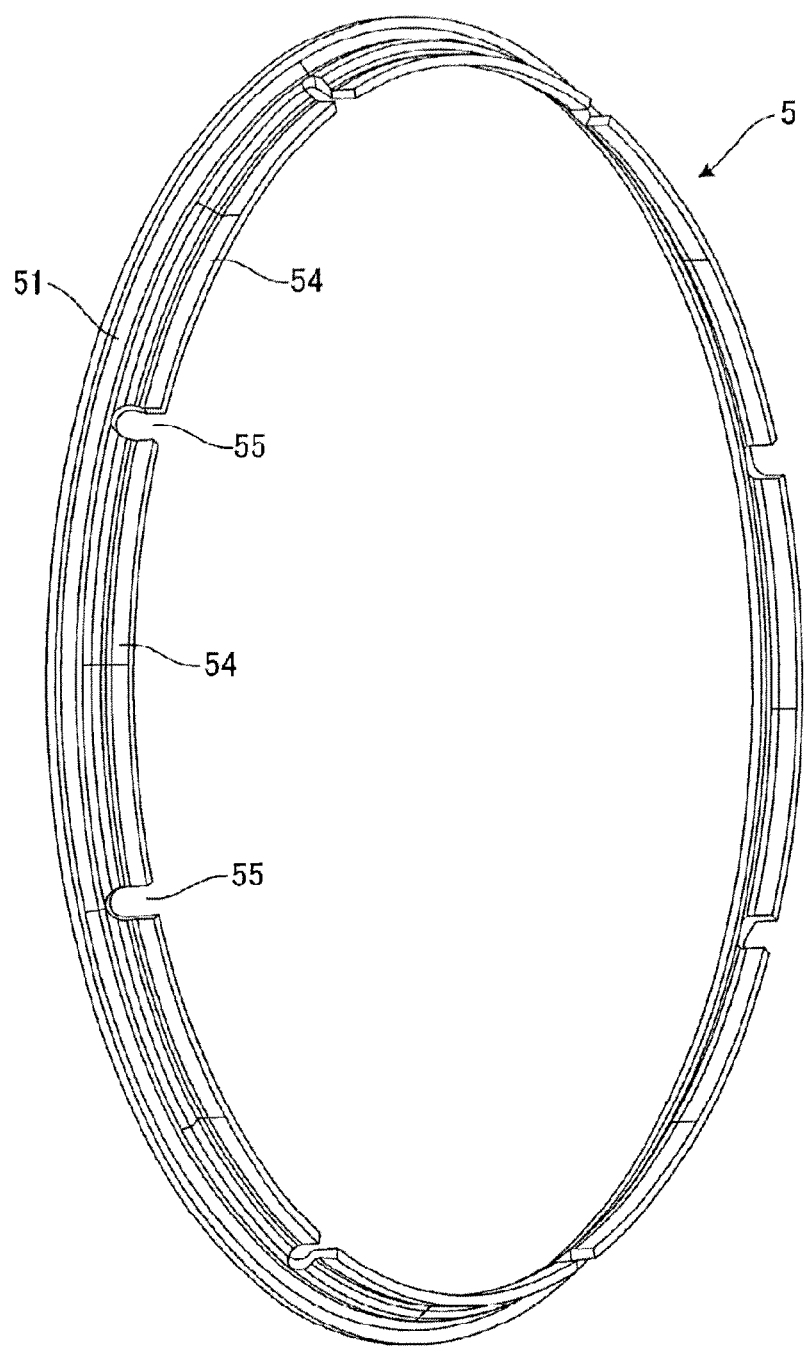
FIG. 9 is a perspective view showing an example of the crimp retainer.
Figure 10:
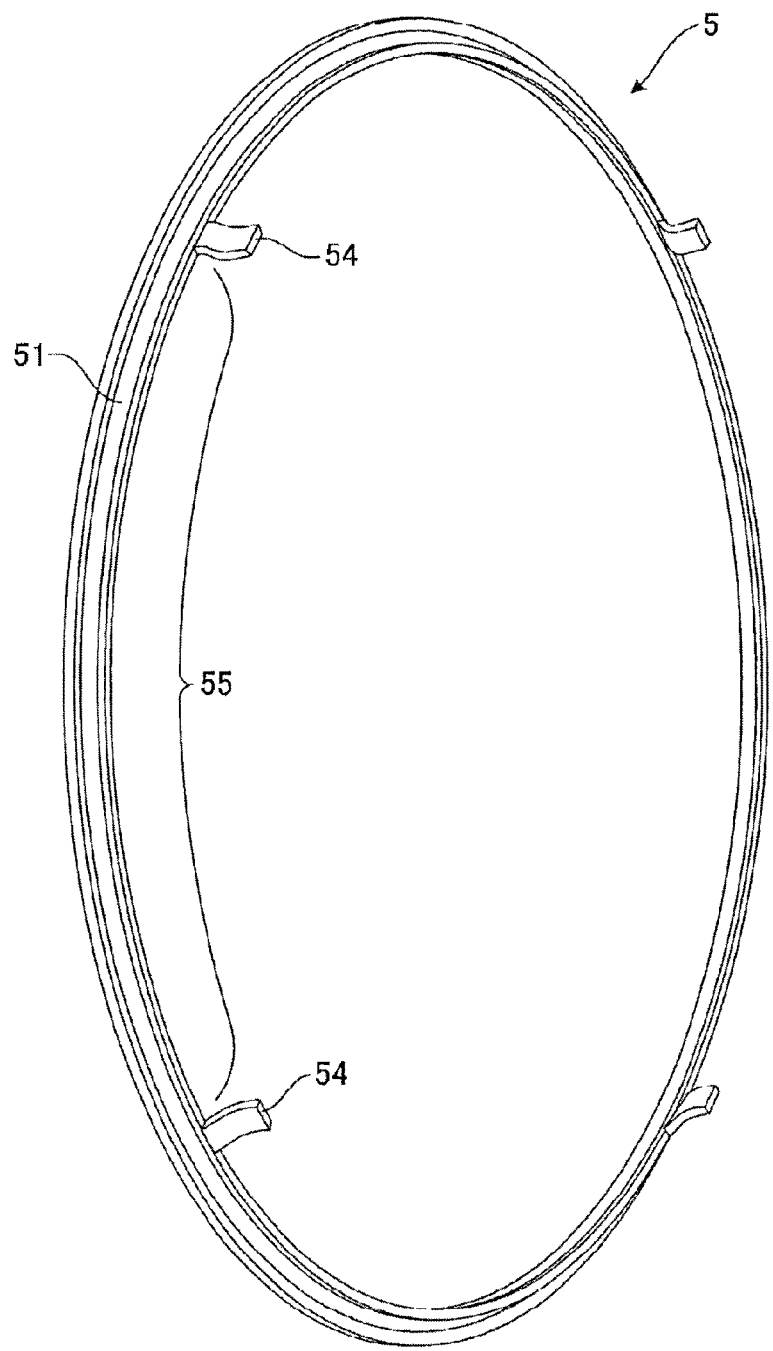
FIG. 10 is a perspective view showing another example of the crimp retainer.

In the crimp processing described above, when the crimp part 54 at the end of the sleeve portion 53 of the crimp retainer 5 is fitted into the crimp groove 43, as the bending end is decreased in diameter to decrease the circumferential length, the circumferential length has an extra. Hence, as shown in FIG. 8, in the crimp part 54 at the end of the sleeve portion 53, slits 55 extending from the end portion in the axial direction are spaced regularly in the circumferential direction, the slits 55 absorb the extra of the circumferential length and thus the bending end inward in the radial direction reliably reaches the bottom of the crimp groove 43. As shown in FIG. 9, the slits 55 described above having a small width may be arranged regularly, for example, at eight places in the circumferential direction, and as shown in FIG. 10, the slits 55 having a large width may be arranged regularly, for example, at four places in the circumferential direction. FIGS. 9 and 10 show an example of the width and the number of slits 55, and as necessary, the width and the number thereof are preferably changed and set.

Figure 11:
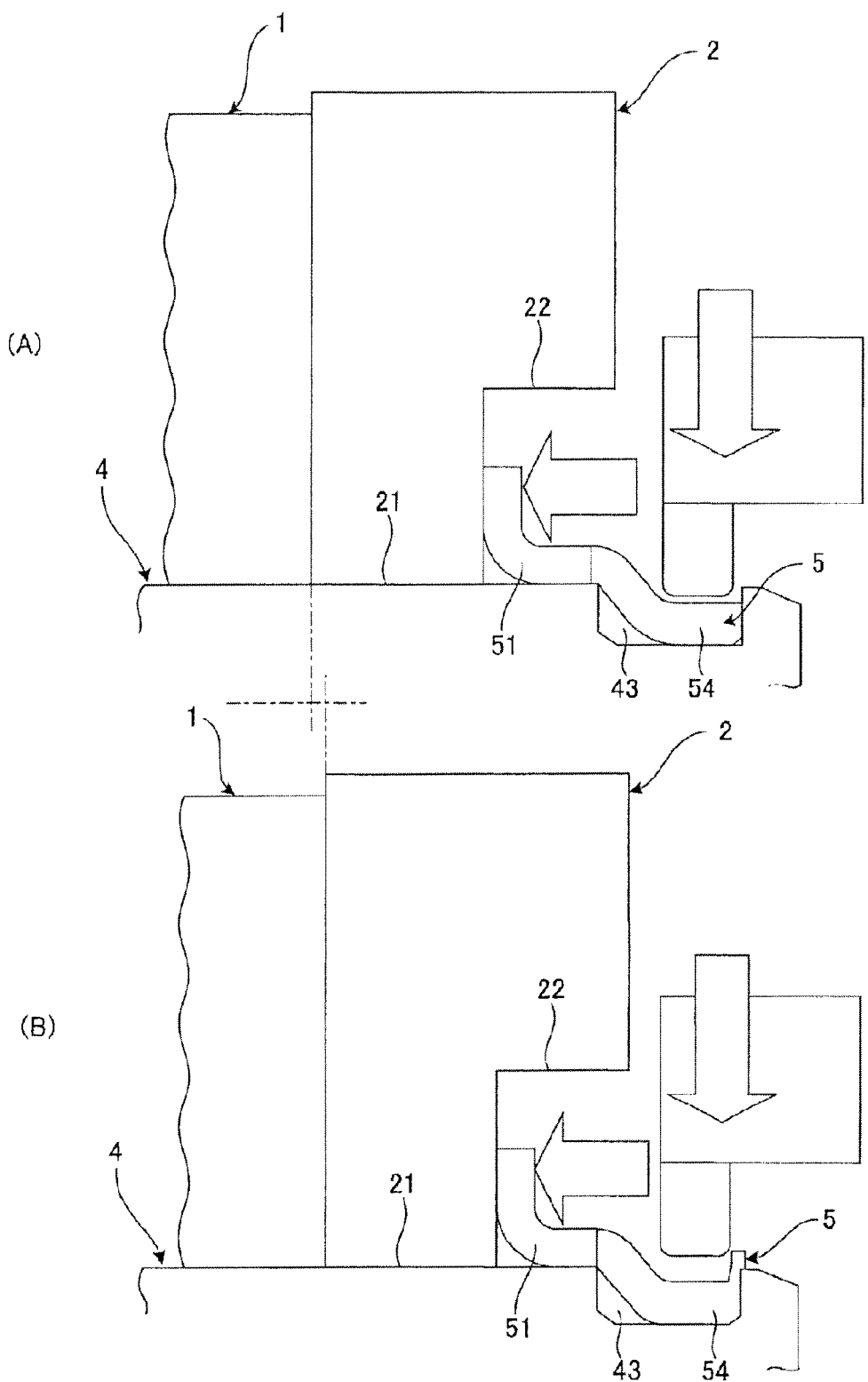
FIG. 11 is an illustrative view showing shapes (A) and (B) of the crimp retainer after crimping.

Since the core 1 is structured by stacking, for example, a few hundreds of electromagnetic steel plates in the axial direction, the dimension of the core 1 in the stacked state in the axial direction is changed for each stacked core 1. An error in the stacking dimension described above causes the position of the crimp retainer 5 in the axial direction to be changed. Hence, with respect to the average stacking dimension of the core 1, as shown in FIG. 6, the dimension of the crimp part 54 in the axial direction is set such that the crimp part 54 of the crimp retainer 5 straddles the crimp groove 43. In the setting described above, when the crimp part 54 is crimped from the outer circumference, as shown in FIG. 11(B), the crimp part 54 is engaged with the wall surface on the outside of the crimp groove 43 in the axial direction, and the end of the crimp part 54 extends off the end portion of the crimp groove 43.

Then, when the dimension of the core 1 in the axial direction tends to become excessive, the position of the crimp part 54 of the crimp retainer 5 facing the crimp groove 43 is moved outwardly in the axial direction, straddles the crimp groove 43 and is positioned further outwardly in the axial direction. In this case, after the crimp processing, the crimp part 54 is engaged with the wall surface on the outside of the crimp groove 43 in the axial direction and the end of the crimp part 54 extends off the end portion of the crimp groove 43 more than shown in FIG. 11(B).

Then, when the dimension of the core 1 in the axial direction tends to become insufficient, the position of the crimp part 54 of the crimp retainer 5 facing the crimp groove 43 is moved inwardly in the axial direction, and the end of the crimp part 54 is arranged in an end of the region of the crimp groove 43. In this case, after the crimp processing, the end of the crimp part 54 does not extend off the end portion of the crimp groove 43 on the outside in the axial direction, and is, as shown in FIG. 11(A), engaged with the wall surface on the outside of the crimp groove 43 in the axial direction.

In this way, it is possible to absorb the error in the stacking dimension of the core 1 by changing the bending state of the crimp part 54 of the crimp retainer 5, and to apply a constant pre-pressure after the assembly (after the crimping) regardless of the error in the dimension of the core 1 in the axial direction.

In the present embodiment, it is possible to obtain the following effects.

(A) In the rotor shaft 4, the crimp groove 43 is formed in the outer circumferential portion of any one of the end plates 2 on the outside in the circumferential direction. The one end plate 2 is located in the axial direction by the inside end of the crimp retainer 5 in the axial direction that is ring-shaped, that covers the crimp groove 43 of the rotor shaft 4 to fit to the rotor shaft 4, that is fitted into the crimp groove 43 of the rotor shaft 4 by crimping an outside portion in the axial direction from an outer circumferential side, and that engages with the wall surface of the crimp groove 43 on the outside in the axial direction. In other words, the outside portion of the crimp retainer 5 in the axial direction that presses onto the one end plate 2 and locates it in the axial direction is crimped from the outer circumferential side, is fitted into the crimp groove 43 of the rotor shaft 4 and is engaged with the wall surface of the crimp groove 43 on the outside in the axial direction. Hence, the crimp retainer 5 engages with the wall surface of the crimp groove 43 on the outside in the axial direction, and thus it is possible to locate the core 1 without coming off in the axial direction, and its reaction acts on the one end plate 2 so as to press it in the axial direction, and thus it is possible to fix the rotor shaft 4 with a predetermined pre-pressure applied to the core 1.

(B) The crimp retainer 5 includes, in the outside portion in the axial direction crimped from the outer circumferential side to fit into the crimp groove 43 of the rotor shaft 4, the slits 55 that extend from the external end portion in the axial direction to the inside in the axial direction a predetermined angular space apart in the circumferential direction. In other words, when the crimp part 54 at the end of the sleeve portion 53 of the crimp retainer 5 of the crimp retainer 5 is fitted into the crimp groove 43, as the bending end is decreased in diameter to decrease the circumferential length, the circumferential length has an extra. However, since the crimp part 54 at the end of the sleeve portion 53 includes the slits 55 extending from the end portion in the axial direction a given space apart from each other in the circumferential direction, the slits 55 absorb the extra of the circumferential length and thus it is possible to make the bending end inward in the radial direction reliably reach the bottom of the crimp groove 43.

(C) The crimp retainer 5 is, according to the position of the one end plate 2 in the axial direction in contact with the inside end in the axial direction, crimped from the outer circumferential side and fitted into the crimp groove 43 of the rotor shaft 4, and the position in the axial direction engaging with the wall surface of the crimp groove 43 on the outside in the axial direction is changed. In other words, since the core 1 is structured by stacking, for example, a few hundreds of electromagnetic steel plates in the axial direction, the dimension in the stacked state in the axial direction is changed for each stacked core 1. An error in the stacking dimension described above causes the position of the crimp retainer 5 in the axial direction to be changed. However, it is possible to absorb the change in the stacking dimension of the core 1 by changing the bending state of the crimp part 54 of the crimp retainer 5, and to apply a constant pre-pressure after the assembly (after the crimping) regardless of the error in the dimension of the core 1 in the axial direction.

(D) The crimp retainer 5 includes, in the inside end in the axial direction, the ring-shaped flange portion 52 extending in the radial direction, and is brought into contact with the one end plate 2 by the ring-shaped flange portion 52. In other words, in the ring-shaped portion 51 of the crimp retainer 5, its cross section is formed in the shape of an L with the flange portion 52 and the sleeve portion 53 such that shape rigidity, that is, bending rigidity with respect to the flat surface perpendicular to the shaft is acquired by the sleeve portion 53 and circular rigidity is acquired by the flange portion 52.

Second Embodiment

Figure 12:
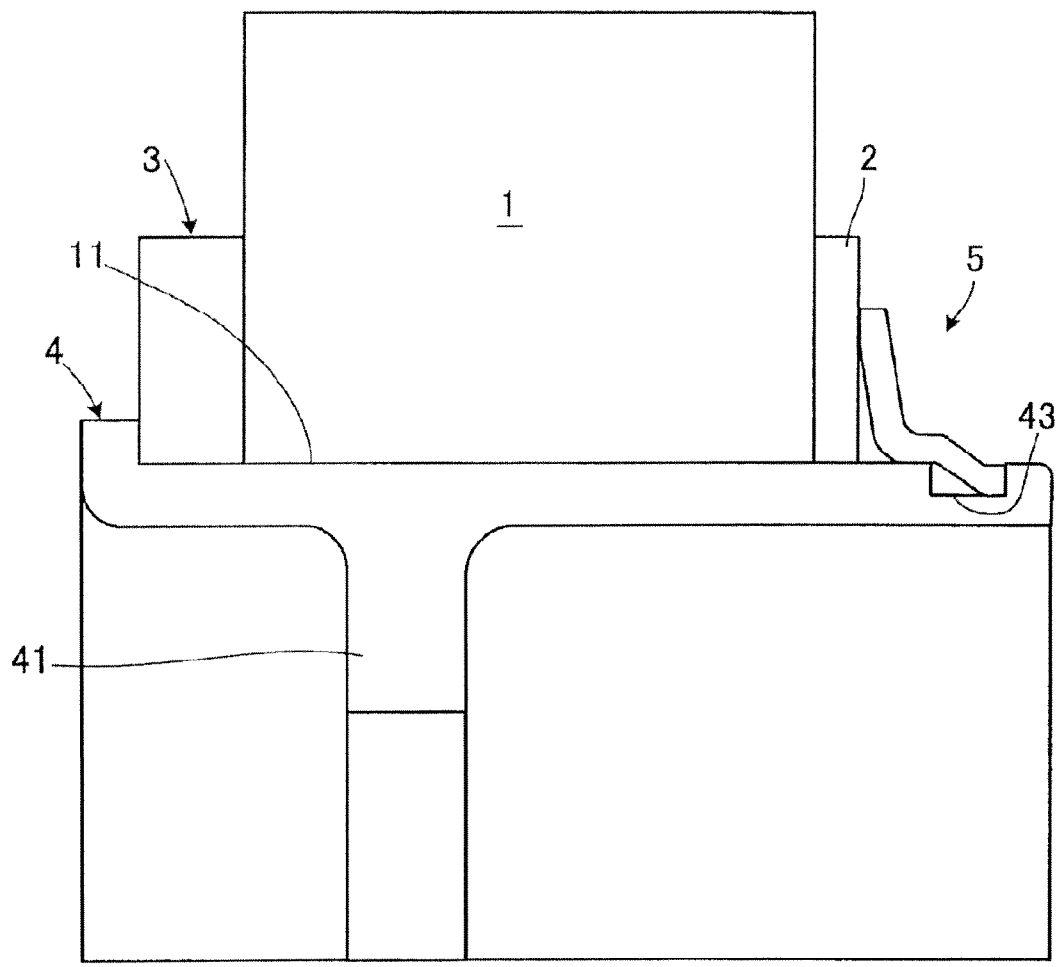
FIG. 12 is a schematic configuration diagram of a rotor mechanism of a rotating electrical machine showing a second embodiment of the present invention.
Figure 13:
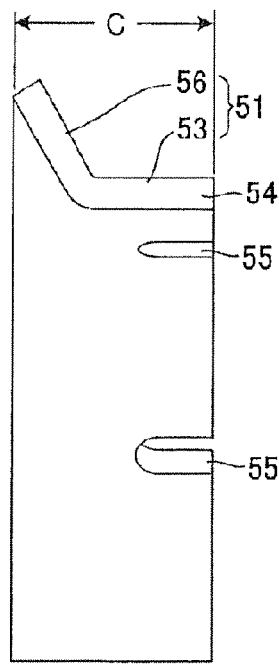
FIG. 13 is a cross-sectional view of a crimp retainer.

FIGS. 12 to 15 show a second embodiment of a rotor mechanism of a rotating electrical machine according to the present invention. FIG. 12 is a cross-sectional view of the rotor mechanism of the rotating electrical machine and FIG. 13 is a cross-sectional view of the crimp retainer. In the present embodiment, the ring-shaped portion of the crimp retainer is changed into a spring structure that makes the flange portion act in the axial direction, which is added to the first embodiment. The same devices as in the first embodiment are identified with the same symbols, and their description will be omitted or simplified.

As shown in FIG. 13, the crimp retainer 5 of the present embodiment is formed with the ring-shaped portion 51 composed of a tapered flange portion 56 and the ring-shaped sleeve portion 53 and the crimp part 54 that protrudes from the sleeve portion 53 in the axial direction and that is deformed by crimping. This crimp retainer 5 is formed of a high elastic material, for example, with high tensile strength steel sheets commonly referred to as a "high-tension material." The other configurations are the same as in the first embodiment.

Figure 14:
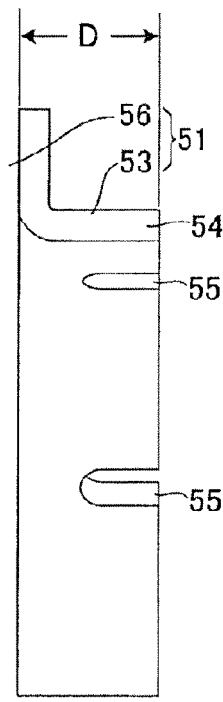
FIG. 14 is a cross-sectional view of the crimp retainer in a compressed state.

In the crimp retainer 5, a compression force is applied in the axial direction, and thus the tapered flange portion 56 can be elastically deformed in such a direction that the taper angle is increased. In other words, as a compression force is added in the axial direction, the taper angle of the flange portion 56 is increased according to the compression force, and a dimension C without the compression in the axial direction shown in FIG. 13 being applied can be finally changed to a dimension D obtained by raising the flange portion 56 in a vertical direction by elastic deformation, as shown in FIG. 14.

Then, the sleeve portion 53 and the crimp part 54 are formed to fit to the outer circumference of the rotor shaft 4, and the sleeve portion 53 is fitted to the rotor shaft 4 to be located in the radial direction with respect to the rotor shaft 4.

In other words, the crimp retainer 5 is fitted to the rotor shaft 4 from the side of the crimp groove 43, and, as shown in FIG. 12, the end of the flange portion 56 is brought into contact with the side surface of the one end plate 2. Then, the sleeve portion 53 and the crimp part 54 of the crimp retainer 5 are pressed from the side of the crimp retainer 5 in the axial direction such that a constant pre-pressure (pre-load) is applied to the end plate 3, the core 1 and the end plate 2 arranged between the crimp retainer 5 and the protrusion portion 42 of the rotor shaft 4. Here, the flange portion 56 of the crimp retainer 5 is elastically deformed by the constant pre-pressure (pre-load) described above such that the taper angle is increased.

Thereafter, the crimp part 54 of the crimp retainer 5 is bent by crimp processing from the outer circumference into the crimp groove 43 inwardly in the radial direction, thus is fitted into the crimp groove 43 and is located with respect to the rotor shaft 4 in the axial direction. Then, in the crimp retainer 5, the bending end of the crimp part 54 is pressed onto the wall surface of the bottom portion of the crimp groove 43, is prevented from being moved outwardly in the axial direction and is strutted, and thus it is possible to locate and fix the crimp retainer 5 on the rotor shaft 4 with the pre-pressure kept applied to both the end plates 2 and 3 and the core 1.

Figure 15:
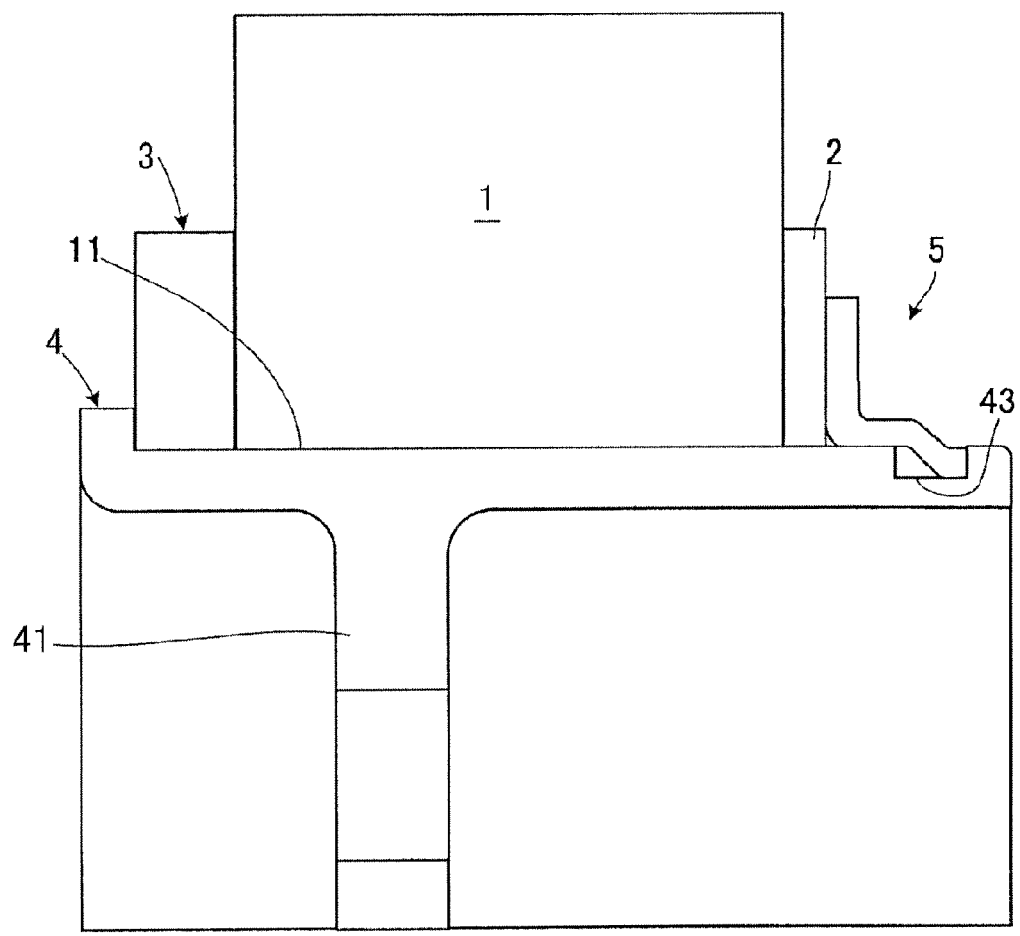
FIG. 15 is a schematic configuration diagram of the rotor mechanism of the rotating electrical machine showing one aspect where the crimp retainer is elastically deformed.

In this state, the amount of elastic deformation of the flange portion 56 of the crimp retainer 5 is changed according to the position of the one end plate 2 in the axial direction. In other words, since the core 1 is structured by stacking, for example, a few hundreds of electromagnetic steel plates in the axial direction, the dimension in the stacked state in the axial direction is changed for each stacked core 1. FIG. 15 shows a state where the position of the one end plate 2 is changed to the side of the crimp retainer 5 caused by an error in the stacking dimension described above. However, in the present embodiment, the amount of elastic deformation of the flange portion 56 of the crimp retainer 5 is changed by the error in the stacking dimension described above. As described above, it is possible to absorb variations in the stacking dimension of the core 1 by changing the amount of elastic deformation of the flange portion 56 of the crimp retainer 5, and to apply a constant pre-pressure after the assembly (after the crimping) regardless of the error in the dimension of the core 1 in the axial direction.

In the present embodiment, it is possible to obtain the following effects in addition to the effects (A), (B) and (D) in the first embodiment.

(E) The crimp retainer 5 includes, in the inside end in the axial direction, the ring-shaped flange portion 56 extending in the radial direction, the flange portion 56 is obliquely formed to be tapered such that its end is brought into contact with the one end plate 2 and the tapered inclination angle is changed according to the position of the one end plate 2 in the axial direction in contact with the inside end in the axial direction. In other words, since the core 1 is structured by stacking, for example, a few hundreds of electromagnetic steel plates in the axial direction, the dimension in the stacked state in the axial direction is changed for each stacked core 1. However, the amount of elastic deformation of the flange portion 56 of the crimp retainer 5 is changed by the error in the stacking dimension described above. As described above, it is possible to absorb variations in the stacking dimension of the core 1 by changing the amount of elastic deformation of the flange portion 56 of the crimp retainer 5, and to apply a constant pre-pressure after the assembly (after the crimping) regardless of the error in the dimension of the core 1 in the axial direction.

Although the embodiments of the present invention have been described above, the embodiments described above simply show an example of the application of the present invention, and the technical scope of the present invention is not intended to be limited to the specific configurations of the embodiments.

This application claims priority based on JP2011-45287, filed with the Japan Patent Office on Mar. 2, 2011 and JP2012-43774 filed with the Japan Patent Office on Feb. 29, 2012, the entire contents of which are incorporated into this specification by reference.

The invention claimed is:

1. A rotor mechanism of a rotating electrical machine that includes a core obtained by stacking a plurality of disc-shaped magnetic steel plates on an outer circumference of a rotor shaft and disc-shaped end plates arranged on both sides of the core in an axial direction,
    wherein the rotor shaft includes a crimp groove that is formed, in a circumferential direction, in an outer circumferential portion of any one of the end plates on an outside in the axial direction,
    the one end plate is located in the axial direction by an inside end of a crimp retainer in the axial direction that is ring-shaped, that covers the crimp groove of the rotor shaft to fit to the rotor shaft, that is fitted into the crimp groove of the rotor shaft by crimping an outside portion in the axial direction from an outer circumferential side and that engages with a wall surface of the crimp groove on the outside in the axial direction, and
    the crimp retainer includes, in the outside portion in the axial direction, slits that extend from an external end portion in the axial direction to an inside in the axial direction.

2. The rotor mechanism of the rotating electrical machine according to claim 1,
    wherein the crimp retainer includes, in the outside portion in the axial direction crimped from the outer circumferential side to fit into the crimp groove of the rotor shaft, slits that extend from an external end portion in the axial direction to an inside in the axial direction a predetermined angular space apart in the circumferential direction.

3. The rotor mechanism of the rotating electrical machine according to claim 1,
    wherein the crimp retainer is, according to a position of the one end plate in the axial direction in contact with the inside end in the axial direction, crimped from the outer circumferential side and fitted into the crimp groove of the rotor shaft, and the position in the axial direction engaging with the wall surface of the crimp groove on the outside in the axial direction is changed.

4. The rotor mechanism of the rotating electrical machine according to claim 1,
    wherein the crimp retainer includes, in the inside end in the axial direction, a ring-shaped flange portion extending in a radial direction, and is brought into contact with the one end plate by the ring-shaped flange portion.

5. The rotor mechanism of the rotating electrical machine according to claim 1,
    wherein the crimp retainer includes, in the inside end in the axial direction, a ring-shaped flange portion extending in a radial direction, the flange portion is obliquely formed to be tapered such that an end of the flange portion is brought in contact with the one end plate and a tapered inclination angle is changed according to a position of the one end plate in the axial direction in contact with the inside end in the axial direction.

6. The rotor mechanism of the rotating electrical machine according to claim 1, wherein the crimp groove is formed around an entire circumference of the outer circumferential portion of the rotor shaft.

7. A method of manufacturing a rotor mechanism of a rotating electrical machine that includes a core obtained by stacking a plurality of disc-shaped magnetic steel plates on an outer circumference of a rotor shaft and disc-shaped end plates arranged on both sides of the core in an axial direction,
   wherein the rotor shaft includes a crimp groove that is formed, in a circumferential direction, in an outer circumferential portion of any one of the end plates on an outside in the axial direction,
   a ring-shaped crimp retainer including, in an outside portion in the axial direction, slits that extend from an external end portion in the axial direction to an inside in the axial direction is fitted to the rotor shaft to cover the crimp groove of the rotor shaft, and an inside end of the crimp retainer in the axial direction is pressed thereonto by applying a pre-pressure to the one end plate and
   an outside portion of the crimp retainer in the axial direction is then crimped from an outer circumferential side to fit into the crimp grove of the rotor shaft and is engaged with a wall surface of the crimp groove on an outside in the axial direction such that the one end plate is located in the axial direction.

* * * * *